No. 721,933. PATENTED MAR. 3, 1903.
C. M. BENNETT.
LOW JOINT INDICATING MECHANISM.
APPLICATION FILED MAY 12, 1902.
NO MODEL. 5 SHEETS—SHEET 1.

WITNESSES: INVENTOR.
Charles M. Bennett
BY
ATTORNEY.

No. 721,933. PATENTED MAR. 3, 1903.
C. M. BENNETT.
LOW JOINT INDICATING MECHANISM.
APPLICATION FILED MAY 12, 1902.
NO MODEL. 5 SHEETS—SHEET 2.

WITNESSES:
H. B. Bradshaw
A. L. Phelps

INVENTOR.
Charles M. Bennett
BY
C. Shepherd
ATTORNEY.

No. 721,933. PATENTED MAR. 3, 1903.
C. M. BENNETT.
LOW JOINT INDICATING MECHANISM.
APPLICATION FILED MAY 12, 1902.
NO MODEL. 5 SHEETS—SHEET 3.
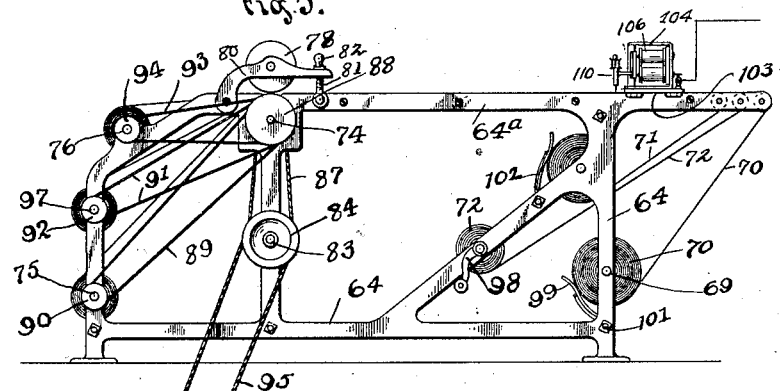
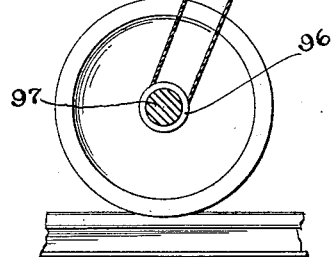
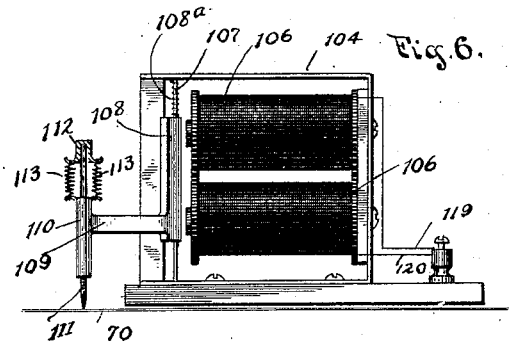
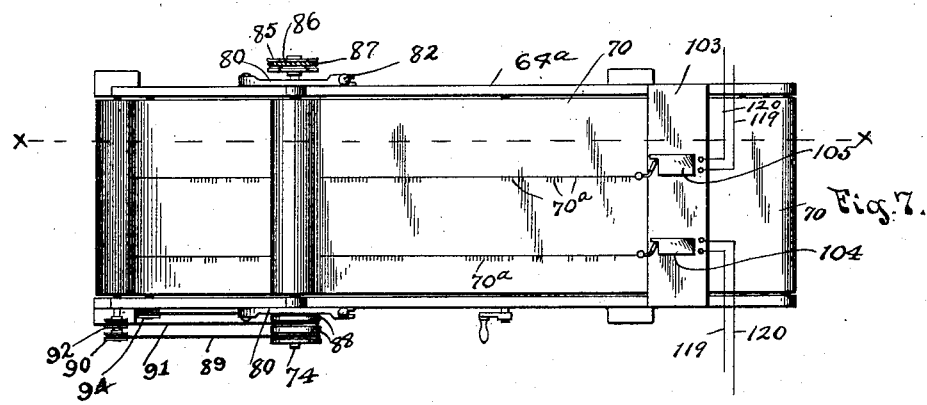
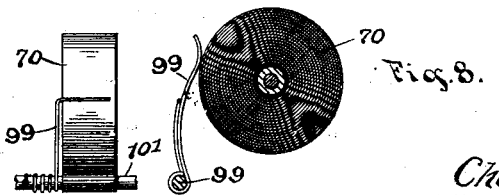
WITNESSES:
H. B. Bradshaw
A. L. Phelps
INVENTOR.
Charles M. Bennett
BY
C. C. Shepherd
ATTORNEY.

No. 721,933. PATENTED MAR. 3, 1903.
C. M. BENNETT.
LOW JOINT INDICATING MECHANISM.
APPLICATION FILED MAY 12, 1902.
NO MODEL. 5 SHEETS—SHEET 4.

WITNESSES:
H. B. Bradshaw
A. L. Phelps

INVENTOR.
Charles M. Bennett
BY C. C. Shepherd
ATTORNEY.

No. 721,933. PATENTED MAR. 3, 1903.
C. M. BENNETT.
LOW JOINT INDICATING MECHANISM.
APPLICATION FILED MAY 12, 1902.
NO MODEL. 5 SHEETS—SHEET 5.

WITNESSES:
H. B. Bradshaw
A. L. Phelps

INVENTOR.
Charles M. Bennett
BY
C. C. Shepherd
ATTORNEY.

UNITED STATES PATENT OFFICE.

CHARLES M. BENNETT, OF ZANESVILLE, OHIO.

LOW-JOINT-INDICATING MECHANISM.

SPECIFICATION forming part of Letters Patent No. 721,933, dated March 3, 1903.

Application filed May 12, 1902. Serial No. 106,913. (No model.)

*To all whom it may concern:*

Be it known that I, CHARLES M. BENNETT, a citizen of the United States, residing at Zanesville, in the county of Muskingum and State of Ohio, have invented a certain new and useful Improvement in Low-Joint-Indicating Mechanism, of which the following is a specification.

My invention relates to the improvement of railway-track-inspection apparatus of that class which is adapted to be used on or in connection with a railway-car for indicating the condition of the track over which said car passes.

The objects of my invention are to provide an improved apparatus in connection with a railway-car with means for automatically marking the low joints of track-rails, to provide improved means in conjunction therewith for producing a record in duplicate of the low joints of both rails over which the car travels and at the same time to indicate the number of low joints, and to produce other improvements, the details of construction of which will be more fully pointed out hereinafter. These objects I accomplish in the manner illustrated in the accompanying drawings, in which—

Figure 1:
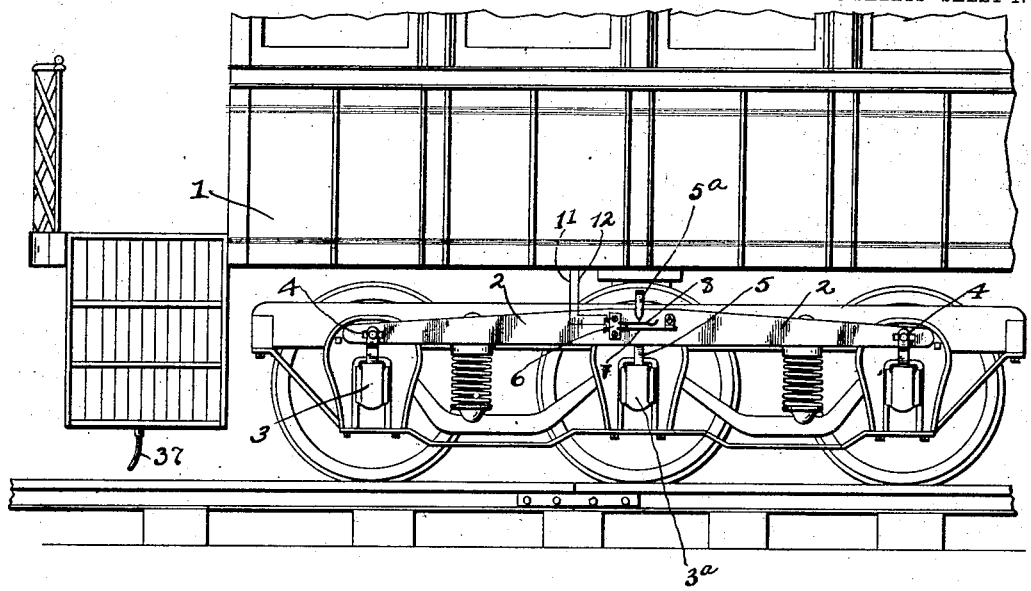
Figure 2:
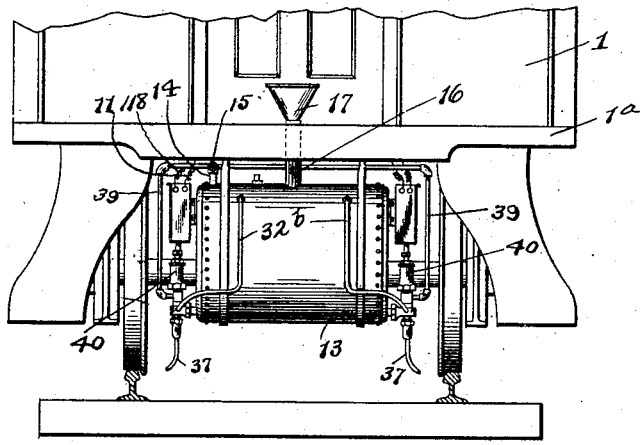
Figure 3:
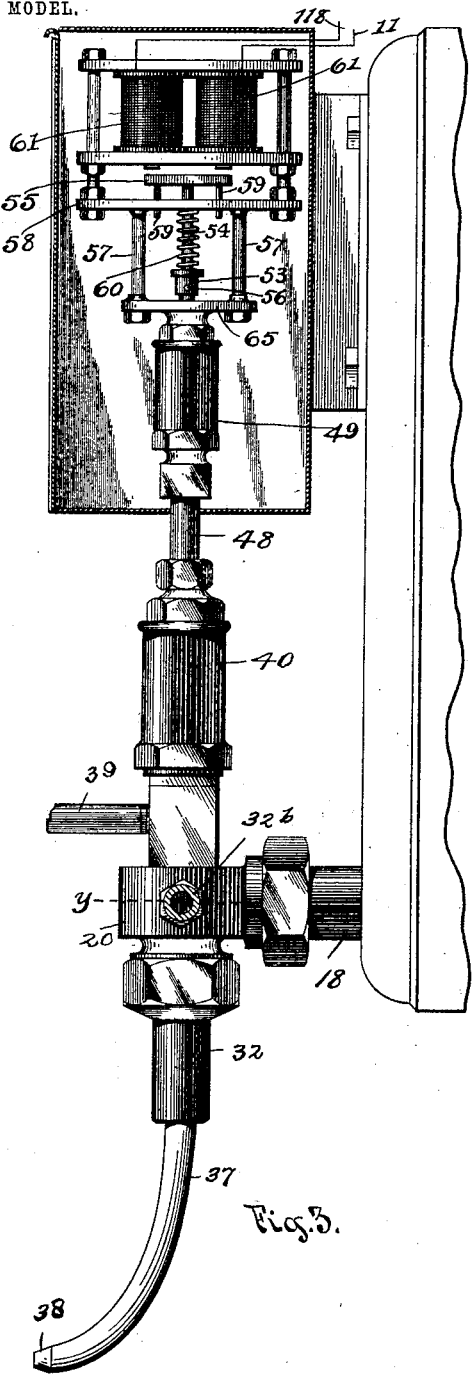
Figure 4:
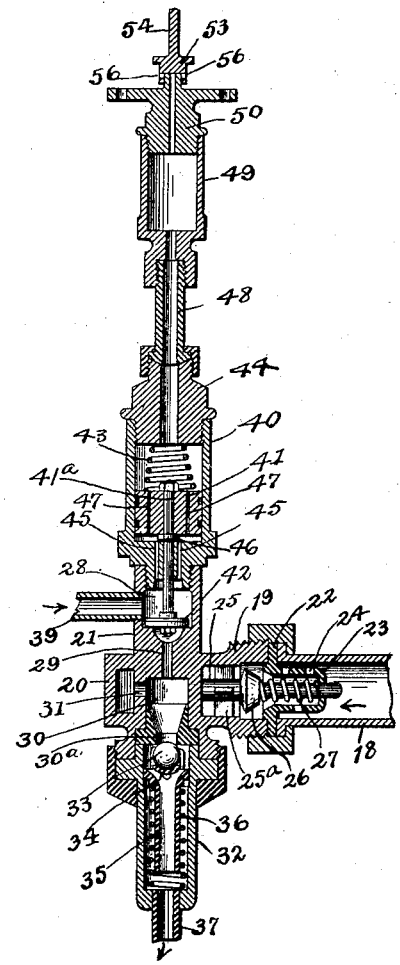
Figure 10:
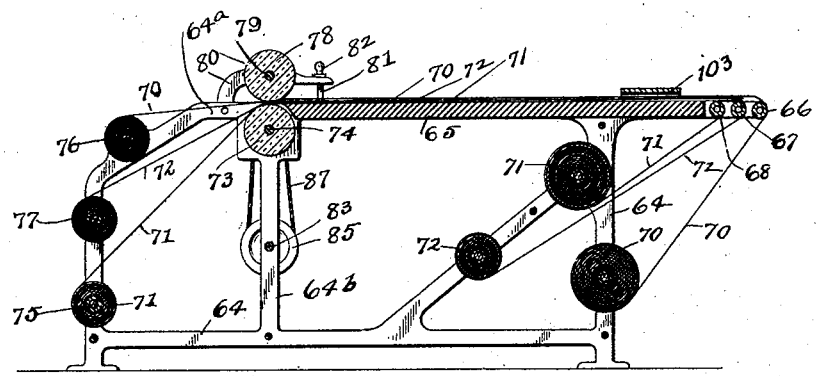
Figure 11:
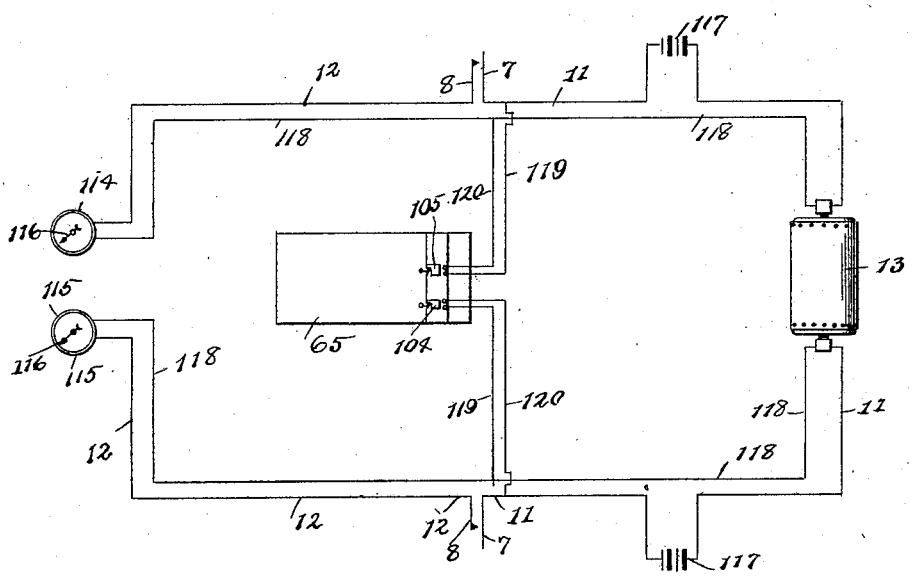
Figure 12:
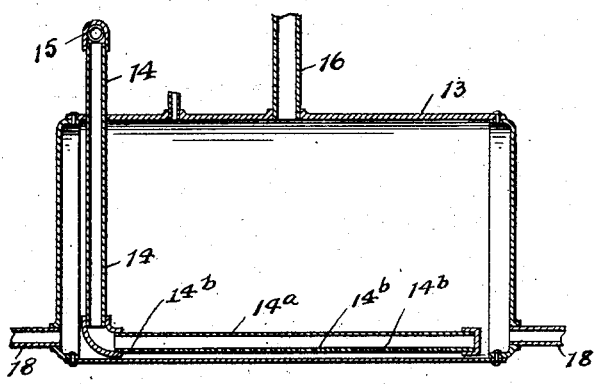
Figure 13:
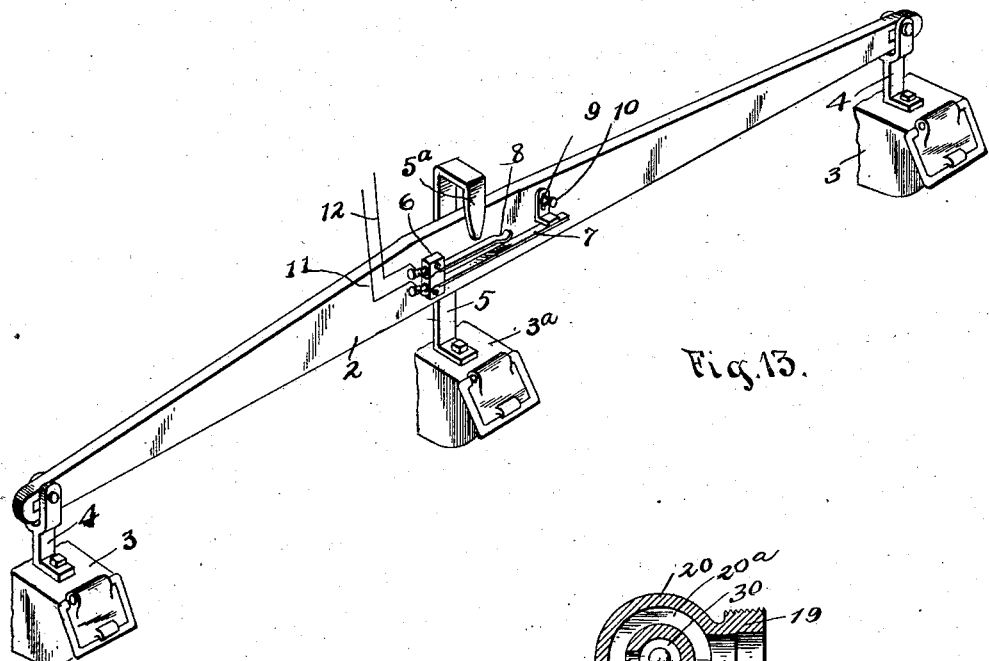
Figure 14:
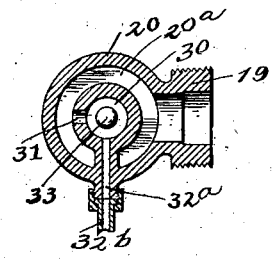

Figure 1 is a side elevation of a portion of a car, showing a portion of my improvement in connection therewith. Fig. 2 is a rear end view of a portion of a car, showing my improved track-marking apparatus thereon. Fig. 3 is a view in elevation of the valve mechanism which I employ in connection with a track-marker. Fig. 4 is a central vertical section of said valve-casing and mechanism. Fig. 5 is a side elevation of the recording device. Fig. 6 is a detail view in elevation of the electric device for controlling the operation of the recording-pencil. Fig. 7 is a plan view of the recording device. Fig. 8 is an enlarged transverse section of one of the paper-rolls. Fig. 9 is a side elevation of the same. Fig. 10 is a sectional view on line $x\ x$ of Fig. 7. Fig. 11 is a diagram illustrating the electric-circuit connections with the various parts of my apparatus. Fig. 12 is a central longitudinal section through the tank or cylinder from which the track-marking material is discharged. Fig. 13 is a detail view in perspective of one of the contact-producing attachments of the car-trucks; and Fig. 14 is a transverse section through the lower portion of the valve mechanism, taken on line $y$ of Fig. 3.

Similar numerals refer to similar parts throughout the several views.

In carrying out my invention I provide on opposite sides of a railway-car 1 and on the outer side of the truck-wheels a horizontally-disposed beam 2, each of these beams having connections at its ends with the boxings 3 of the end wheels of the truck through the medium of suitable standards or arms 4. With the center box $3^a$ of the center truck-wheel is connected an upwardly-extending bar or arm 5, the forwardly-extending and downturned end portion $5^a$ of which loosely embraces the upper portion of the beam 2 at the center of its length. Secured to the outer side of the beam 2 at one side of the bar 5 is a non-conducting block 6, from which project in the direction of the length of said beam metallic contact-strips 7 and 8, the latter arranged above the former in the manner indicated more clearly in Fig. 13 of the drawings. The lower strip 7 is of greater length than the upper strip and has its extended portion engaging the under side of an angular stop-plate 9, the upwardly-extending portion of which is adjustable vertically on the beam 2 by means of a set-screw 10, which passes through a vertically-slotted opening in said plate 9. Connected with each of the contact-strips 7 and 8 are the ends of wires 11 and 12.

Supported from and beneath the rear platform $1^a$ of the car is a horizontally-disposed cylindrical tank 13. This tank, as indicated more clearly in Fig. 12 of the drawings, has leading therein through its upper side and near one end a pipe 14, which at its lower end is provided with a horizontal arm $14^a$, extending on the inner side of the tank and preferably near the bottom thereof, said pipe-arm being closed at its outer end and provided at intervals on its under side with perforations $14^b$. The outwardly-projecting upper end portion of this pipe 14 is adapted to be connected with one of the train air-pipes 15. Leading into the upper side of the tank or cylinder 13 is a feed-pipe 16, which, if desired, may pass upward through the platform $1^a$ of the car and receive the reduced end of a funnel 17. At each end of the tank and in the lower portion thereof I provide outwardly-extending pipe-arms 18. Each of these pipes 18 is coupled with a pipe-arm 19, (see Fig. 4,) which extends outwardly from and communicates with the hollow interior of an enlargement 20 of a vertical valve-casing section 21. Between the ends of the pipe-arms 18 and 19 is clamped the laterally-extending end flange 22 of a horizontal valve-seat body 23, the body of said valve-seat extending within the pipe-arm 18 and being of less diameter than the latter. This substantially cup-shaped valve-seat body 23 has its walls perforated at intervals, as indicated at 24. Extending through the valve-seat body 23 and leading into the pipe-arm 19 is a fixed horizontal sliding valve-pin 25, the inner end portion of which is provided with guide projections 25$^a$. Carried on the pin 25 is a valve 26, which is adapted when said pin is moved outward to close the entrance to the valve-seat body 23 and cut off communication between the pipe-arms 18 and 19. The valve 26 is normally held open, however, by means of a coiled spring 27, which surrounds the reduced portion of the pin and extends between the valve and the end of the tubular seat-body 23. The valve-casing or pipe-section 21 is formed hollow and comprises an upper chamber 28, which through a comparatively small central passage 29, which leads from the lower end thereof, communicates with a chamber 30 in that portion of the valve-casing body which is opposite the arm 19 and which is provided with the hollow external enlargement 20. The chamber 30 communicates with the circular passage 20$^a$ of the enlargement 20 through the medium of a port 31. As shown in Fig. 14 of the drawings, the chamber 30 is also provided with a horizontal tubular outlet, which is indicated at 32$^a$, this outlet connecting through a comparatively small pipe 32$^b$, as shown in Fig. 2, with the tank or cylinder 13. The lower portion of the chamber 30 is reduced, as indicated at 30$^a$, at the point where it connects with a cylindrical downward extension 32 of the valve-casing body 21. The reduced outlet 30$^a$ of the chamber 30 is normally closed by a ball-valve 33, which is suitably supported in a seat 34, supported above the enlarged upper end portion of a tubular plunger 35, which is arranged to slide vertically within the cylindrical extension 32. About this tubular plunger is a coiled spring 36, which bears between the lower end of the extension 32 and the under side of the upper enlarged head portion of the plunger 35. From the lower end of the cylindrical extension 32 extends downward and thence outward a curved tube or nozzle 37, the latter preferably having a reduced end portion, as indicated at 38 in Fig. 3. Leading laterally into the chamber 28 is a pipe 39, the latter connecting at its remaining end with one of the train air-pipes which forms in the ordinary manner a part of the air-brake system and which normally contains air under pressure. Connected with the upper end of the valve-casing section 21 is an upwardly-extending cylindrical body 40, within which is adapted to fit and slide a piston 41, the central stem or rod 41$^a$ of which extends downward through a central opening in the bottom of the cylinder 41 into the chamber 28 and carries on its lower end a valve 42, the latter normally closing the passage 29 through pressure of a spring 43, which is arranged between the upper side of the piston 41 and a tubular cylinder-plug 44, which is secured to the head of said cylinder 40. The lower end of said cylinder 40 has formed therethrough on opposite sides of its central piston-rod opening ports 45, which serve at all times to connect the upper end of the chamber 28 and lower end of the cylinder 40. The piston 41 is prevented from cutting off this communication by seating upon the bottom of its containing-cylinder, owing to the employment of a flange 46 on the rod 41$^a$ beneath said piston. The piston-body is also provided with small vertical passages or ports 47, which pass vertically therethrough. Through the medium of a pipe or tube section 48 the upper end of the tubular plug 44 is connected with the lower reduced outlet of a cylindrical body 49, the upper end of which is provided with a plug 50, having a small central passage therethrough, said plug being formed, as indicated, with oppositely-projecting arms 51, above which it terminates in a short nozzle-like extension 52. Fitting over this terminating nozzle is the lower cap-like termination 53 of an upwardly-extending rod 54, on which, as indicated in Fig. 3, is carried a horizontal armature-bar 55. The lower cap termination 53 of the rod 44 has that portion which normally surrounds the nozzle extension 52 of the plug 50 formed with small ports or openings 56. Rising from the outwardly-extending plug-arms 51 are vertical rods or bolts 57, upon the upper ends of which is supported horizontally a bar 58, through the central portion of which the pin 54 passes loosely and through which also pass loosely downwardly-extending guide-pins 59 of the armature-bar 55. The cap termination 53 of the rod 54 is normally held in its lower closed position through the medium of a spring 60, which is mounted upon said cap and extends between the latter and the bar 58. Suitably supported from and above said bar 58 and above the armature-bar 55 is an electromagnet comprising magnet-spools 61, from which lead wires, hereinafter referred to. Suitably supported within the car is an oblong frame 64, which is provided with a horizontal top plate 65. (See Figs. 5 and 10.) Between end extensions of the upper horizontal side bars 64$^a$ of the frame 64 are journaled one in front of the other guide-rollers 66, 67, and 68. Journaled between the rear standards of the frame 64, in the lower portion thereof, are the end spindles of a paper-carrying roll 69, on which is mounted a roll of paper 70. Journaled at a higher point in the rear framework and below the top plate 65 is a second roll of paper 71, and journaled at a point between the upper and lower paper-rolls is a roll of carbon or reproducing paper 72. The paper from the roll 71 runs rearward and over the guide-roller 68, thence forward over the upper side of the top plate 65, running at the forward end portion of the machine over a transverse roller of rubber or similar material 73, the latter being carried on a shaft 74, journaled between rear side frame-standards 64$^b$. From the roller 73 the paper strip 71 runs onto a receiving-shaft 75, journaled in the forward and lower portion of the frame 64. The strip of paper 70 runs rearward and over the outer guide-roller 66, thence forward over the top plate 65, and above the roller 73 to a paper-receiving shaft 76, which is journaled in the upper and rear portion of the frame 64. A strip of carbon-paper from the roll 72 also runs rearwardly from said roll and over the central guide-roller 67, thence forward between the paper strips 70 and 71 to a carbon-paper-receiving shaft 77, which is journaled in the framework between the shafts 75 and 76. Above the feeding and guide roller 73 and parallel therewith is arranged an upper feed and guide roller 78, the latter having its central shaft 79 journaled at its ends in angular bracket-arms 80, the downturned end of each of which is pivotally connected with one of the upper frame-bars 64$^a$. The rear end of each of the bracket-arms 80 has passing through a threaded opening therein a screw 81, which rises from the adjoining side frame-bar 64$^a$ and which is provided on its upper end with an adjusting-nut 82. The upper feed and guide roll 78, which is also of rubber, is adapted to press the strips of paper 70, 71, and 72 into feeding contact with the roll 73. Journaled in the lower portions of the forward standards 64$^b$ is a shaft 83, the latter carrying on one end a belt or pulley wheel 84 and on its remaining end a similar belt or pulley wheel 85. The wheel 85 is connected with a wheel 86, carried on one end of the shaft 74 by a belt or other suitable connection 87. Upon an extension of the shaft 74 is carried a wheel 88, having a plurality of grooves, in one groove of which runs a cord or belt 89, which also runs to a pulley or wheel 90 on one end of the shaft 75. In another of the grooves in the wheel 88 runs a cord or belt 91, which runs over a pulley or wheel 92 on one end of the shaft 77, and in an inner groove of said wheel 88 runs a belt or cord 93, which also runs over a pulley 94 on the end of the shaft 76. The wheel 84 on the shaft 83 is connected through a cord or belt 95 with a grooved wheel 96 on one of the axles 97 of the car-wheels, said belt 95 leading downward through a suitable opening in the car-floor. (Not herein shown.) On an extension of the shaft or roll on which the paper strip 72 is wound may be carried a suitable winding crank-handle 98. As indicated in the drawings, I provide for each of the paper-rolls 70 and 71 a spring-wire, which are numbered, respectively, 99 and 100, the free end portion of which is adapted to bear against the periphery of the roll and the remaining ends of these wires being secured, respectively, to transverse frame-rods 101 and 102, said spring-wires exerting a brake-pressure on said rolls.

As indicated at 103, I provide the rear portions of the upper frame-bars 64$^a$ with a transverse bar, which is preferably hinged to one of said frame-bars at one end. On this frame-bar I mount separated frames 104 and 105, in each of which is contained the spools or coils of an electromagnet 106. Journaled vertically in front of each pair of magnet-spools and in the upper and lower portions of the supporting-frame thereof is a rod 107, on which is mounted vertically an armature-bar 108, said armature-bar having an outwardly-extending arm 109, having a vertical tubular termination 110. Through this tube is passed vertically and loosely a pencil 111, the point of which is adapted to bear upon the upper sheet of paper 70, being held in contact with the latter through a pencil-cap 112 on the upper end of the pencil, which is pressed downward through the medium of springs 113, connecting said cap with the pencil-tube 110. The armature-bar 108 is normally held outward away from the cores of the magnets by a spring 108$^a$, carried on the rod 107 and having one end affixed to the frame 104 (or 105) and its remaining end connected with said armature-bar.

At a suitable point in the car I support, preferably adjacent to each other, any suitable well-known construction of electrically-operated counting devices 114 and 115 of that class in which mechanism is provided for imparting equal movements to indicating-hands, such as are indicated at 116, at each closing of an electric circuit therethrough.

In order to illustrate the electric connection or circuits between the various parts of my device, I have shown a diagram of these circuits in Fig. 11 of the drawings, and in this diagram for the sake of clearness in illustration I have indicated the truck contact-strips 7 and 8 by the laterally-extending lines correspondingly numbered in said view. From the strip 7 the wire 11 runs through a battery 117, thence to one of the magnet-spools 61 at the head of the valve mechanism illustrated in Fig. 3. From the remaining one of these spools leads a wire 118, which runs to one post or connecting-point of one of the counters 115 and which through the medium of a wire 119 connects with one of the binding-posts of the electromagnet mounted in the frame 104. The remaining post of said electromagnet is connected through the medium of a wire 120 with the wire 11. The wire 12, which connects with the truck contact-strip 8, leads, as shown, to the remaining connecting point or post of the counter 115. Although I have described the electric connections for one side of the car only, it will be observed by the diagram that the connections on the opposite side of the car are the same, with the exception that the wires 119 and 120 on the opposite side connect the wires 118 and 11 with the binding-posts of the magnet contained in the frame 105, and said wires 12 and 118 on said opposite side connect with the remaining counter 114, while the wires 11 and 118 connect with the magnet at the head of the valve mechanism on the opposite end of the tank 13 from that hereinbefore described.

In operation it will be understood that through the connection of the winding-shafts 75, 77, and 76 with the rotating wheel 88 a comparatively slow traveling motion is imparted to the paper strips 71, 70, and 72 beneath the point of the pencil 111.

The tank or cylinder 13 is designed to contain a suitable quantity of spotting or marking material, such as liquid whiting, which may be fed into said tank through the inlet-pipe 16 and which may be maintained in a thoroughly mixed or mingled condition through the action of the air escaping through the openings $14^b$ of the pipe $14^a$. The parts forming the valve mechanism illustrated in Fig. 4 are normally in the position indicated in said figure, and this being true it is obvious that the chamber 28, as well as the cylinder 40 and parts 48 and 49, will be charged with air under pressure supplied by the pipe 39. Assuming now that the central wheel of the truck indicated in Fig. 1 in running over the track-rails momentarily drops into the depression produced by a low joint of said rails, it will be understood that the contact-point $5^a$ of the bar 5 will by this temporary lowering of said wheel press the upper strip 8 into contact with the lower strip 7, thereby closing a circuit through the wires 11 and 12, through the magnet-spools 61 at the head of the valve mechanism on the corresponding side of the car, and through the magnet contained in the frame 104 and the counter 115. This temporary closing of said circuit through the magnet-spools 61 and the consequent magnetizing of the cores of said spools results in the upward movement of the armature-bar 55 and in the consequent lifting of the cap 53 to such height on the upper extension of the plug 50 as to permit the escape of air through the central opening of said plug and out through the openings 56 of said cap. By this operation it will be seen that the air-pressure above the piston 41 will be relieved, so that the incoming air-pressure from the pipe 39 will serve to raise said piston, and consequently raise the valve 42. By this operation the spotting or marking material, which we will refer to as "whiting" and which has been previously drawn from the tank 13 through the hollow of the enlargement 20 and thence through the port 21 to the chamber 30, will by pressure of the air entering said chamber through the passage 29 be forced downward, depressing the ball-valve 33 and its supporting-tube 35 and permitting the charge of whiting to be forced downward through said tube 35 and through the discharging-tube 37 and nozzle 38 against the side of the track-rail. Owing to the location of the valve mechanism beneath the rear platform and in rear of the trucks, it is obvious that the discharge from the tube 37 will occur at or near the rail-joint to be marked. It will also be seen that the air-pressure thus contributed to the chamber 30 and to the hollow or passage of the enlargement 20 will serve to close the valve 26 against its seat in the body 23. This operation being accomplished, the wheels having passed the low joint and the contact-strips 7 and 8 again separated, it is obvious that the armature-bar 55 will drop to its normal position through pressure of the spring 60. The air from the pipe 39, which now is allowed to accumulate in the cylinders 40 and 49 and in the passages connecting the same, in conjunction with the spring 43 exerts such downward pressure on the piston 41 as to again close the valve 42 to the position indicated in Fig. 4 of the drawings. The connection of the chamber 30 with the tank, which is accomplished through the medium of the outlet $32^a$ and tube $32^b$, (illustrated in Figs. 14 and 2 of the drawings,) again permits atmospheric pressure in the chamber 30 and allows the spring 37 to open the valve 26 and permit another charge of whiting to enter the passage of the enlargement 20 and chamber 30.

The closing of the circuit through the magnet contained in the frame 104 results in drawing the armature-bar 108 toward the cores of said magnets and in a movement of the pencil on the upper paper strip sufficient to produce a mark thereon, a number of these marks being indicated on the paper strip 70 in Fig. 7 of the drawings at $70^a$. The breaking of the circuit, however, permits the spring $108^a$ to act in again throwing the armature-bar 108 outward and causing the pencil to resume its normal position. It is obvious that where a depression occurs in the track-rails on the opposite side of the car a corresponding action of the armature-bar of the magnet contained in the frame 105 will produce a corresponding operation of the pencil of said magnet. As each mile-stone of the railway-track is passed the end of the mile may be indicated by a transverse line on the upper sheet 70, thus showing by the number of marks $70^a$ between these lines the number of low joints encountered in each mile of travel. It will also be understood that the closing of the circuit will through the connection hereinbefore described with the counters 114 and 115 serve to operate said counters in the usual manner, thus providing a register of the total number of low joints passed.

It will be understood that, owing to the fact that an upper and lower paper recording-strip is provided and that a carbon-sheet is provided between said recording-strips, the action of the pencil on the upper strip must result in the production of duplicate copies of the record.

From the construction and operation herein described it will be seen that means are not only provided for the spotting or marking of low joints in railway-track rails, but that a record of the same is automatically produced which will be of great value in disclosing the condition of the joints of the track-rails.

Having now fully described my invention, what I claim, and desire to secure by Letters Patent, is—

1. In a low-joint-indicating mechanism, the combination with a car and wheel-trucks, of contact-strips, and means whereby the depression of a wheel of said truck results in said strips contacting, a tank connected with the car and having an inlet and outlet, electrically-controlled air-operated discharging mechanism for said tank, and connections between said discharge-operating mechanism and said contact-strips whereby the contacting of the latter controls the discharges from said tank, substantially as specified.

2. In a low-joint-indicating mechanism, the combination with a car and wheel-trucks, of a bar having its movement controlled by the depression of a car-wheel, contact-strips held adjacent thereto, a tank supported in connection with the car, and having an outlet, a conducting and discharging device connecting with said outlet, an air-pipe communicating with said conductor, a valve mechanism in connection with the conductor and adapted to be controlled by air from said pipe, an electromagnet and armature-bar, wires connecting the coils of said magnet through a battery with said contact-strips, and means whereby the pressure of air on the valves of said valve mechanism is controlled by the closing and opening of an electric circuit through said wires, substantially as specified.

3. In a low-joint-indicating mechanism, the combination with a car and its wheel-trucks, of a tank supported on said car and adapted to contain a spotting mixture, said tank having an inlet and outlet, of a valve-controlled mixture-conductor connecting with said tank-outlet, the outlet portion of said conductor having its valve normally closed, a valve-casing leading from said conductor, a valve normally cutting off communication from said valve-casing and conductor, a spring and air-pressed piston connected with said valve and arranged in a cylinder communicating with said valve-chamber, said piston having air-passages therethrough, an air-pipe leading into the valve-chamber, a tubular outlet from said piston-cylinder, a spring-actuated cap normally closing said tubular outlet, said cap connecting with an armature-bar, an electromagnet and wires leading therefrom through a battery, and means connected with the car for connecting said wires during the depression of a wheel of one of the trucks thereby magnetizing the coils of said magnet and lifting said armature-bar and cap, substantially as specified.

4. The combination with a car and the air-pipe system thereof, of a tank to contain a marking fluid, said tank being connected to the air-pipe system and having a valve-controlled outlet, a normally open electric circuit controlling the valve and including normally separated contact members, means for contacting said members and closing the circuit to open the valve by the depression of a car-wheel, and means actuated by the closing of the same circuit to record the number of valve-actuating operations.

5. The combination with a car and the air-pipe system thereof, of a tank to contain a marking fluid, said tank being connected to the air-pipe system, a balanced valve included in said connection, and electrical controlling means for reducing the pressure at one side of the valve to open the outlet of the tank by a depression of a car-wheel.

6. The combination with a car and the air-pipe system thereof, of a tank to contain a marking fluid, said tank being connected to the air-pipe system, a balanced valve included in said connection, electrically-controlled means for reducing the pressure at one side of the valve to open the outlet of the tank, and including an electric circuit having normally separated contact members, and means for contacting said members by the depression of the car-wheel.

7. The combination with a car and the air-pipe system thereof, of a tank to contain a marking fluid, said tank being connected to the air-pipe system, a balanced valve included in said connection, means to reduce the pressure at one side of the valve to open the outlet of the tank, and including an armature and an electromagnet, an electric circuit connected with the magnet and including normally separated contact members, and means to contact said members by the depression of a car-wheel.

8. The combination with a car and the air-pipe system thereof, of a tank to contain a marking fluid, said tank being connected to the air-pipe system, a balanced valve included in said connection and controlling the outlet of the tank, an electric circuit including normally separated contact members, means actuated by the electric circuit to reduce the pressure at one side of the balanced valve to open the outlet of the tank, means actuated by the same electric circuit for recording the number of valve-actuating operations, and means for contacting said contact members by the depression of a car-wheel.

9. The combination with a car and the air-pipe system thereof, of a tank for containing a marking fluid, said tank being connected to the air-pipe system, a balanced valve included in said connection and controlling the outlet of the tank, a traveling record-strip actuated from one of the car-wheels, a normally open electric circuit having contact members, electromagnets included in said circuit, and marking devices actuated by the armature of one of the magnets and in coöperative relation with the record-strip, means controlled by the armature of the other magnet for reducing the pressure at one side of the balanced valve to open the outlet of the tank, and means for contacting the contact members to energize both magnets by the depression of a car-wheel.

CHARLES M. BENNETT.

In presence of—
PERRY SMITH,
JULIET McCOY SMITH.